United States Patent [19]

Chung

[11] Patent Number: 5,056,316
[45] Date of Patent: Oct. 15, 1991

[54] COOLING SYSTEM FOR STIRLING ENGINE

[75] Inventor: Woo S. Chung, Seoul, Rep. of Korea

[73] Assignee: Goldstar Co., Ltd., Seoul, Rep. of Korea

[21] Appl. No.: 555,626

[22] Filed: Jul. 20, 1990

[51] Int. Cl.⁵ ............................................. F25B 21/02
[52] U.S. Cl. .............................................. 62/3.2; 62/6
[58] Field of Search ........................................ 62/3.2, 6

[56] References Cited

U.S. PATENT DOCUMENTS

| | | | |
|---|---|---|---|
| 3,197,342 | 7/1965 | Neild, Jr. ........................... | 62/3.2 X |
| 3,203,189 | 8/1965 | Vogt ..................................... | 62/3.2 |
| 4,474,015 | 10/1984 | Christmas et al. ...................... | 62/3.2 |

Primary Examiner—Lloyd L. King

Attorney, Agent, or Firm—Birch, Stewart, Kolasch & Birch

[57] ABSTRACT

A cooling system for a stirling engine, a cooler composed of thermoelectric heat pump for transferring heat by electric energy, to cooling pipes which are connected from power chamber to regenerator, a cooling chamber disposed around the cooler, and an air preheater disposed at a side of combustion chamber, whereby the operating fluid of engine is cooled by utilizing the thermoelectric heat pump so that circulation of continuous cooling water is not required and heat taken out of the operating fluid is made to use for the pre-heating of the air to be fed to the combustion chamber.

8 Claims, 2 Drawing Sheets

COOLING SYSTEM FOR STIRLING ENGINE

BACKGROUND OF THE INVENTION

1. Field of the Invention

The present invention relates to a cooling system for a Stirling engine and more particularly, to a cooling system for a Stirling engine in which operating fluid of the engine is cooled by utilizing a thermoelectric heat pump so that continuous circulation of cooling water is not required and heat taken out of operating fluid is made to be used for the pre-heating of air to be fed to a combustion chamber.

2. Field of the Prior Art

Generally, various types of Stirling engines utilized are well known in the art. Such Stirling engines suffer from a number of problems such as, for example, (a) when the gas is heated within hermetically sealed container, the pressure is raised, and (b) when the gas is cooled, the pressure is dropped. One of such Stirling engines will be described in detail with reference to the accompanying drawings as followings:

As shown in FIG. 3, a conventional Stirling engine comprises a power piston 2 and a displacer 3 within a cylinder 1, a power chamber 4 disposed in the middle portion of the cylinder 1 for compressing operating fluid, a hot space 5 disposed at the upper portion of the cylinder 1 for expanding the operation fluid, a combustion chamber 6 disposed at the top portion of the cylinder 1, an air pre-heater 7 disposed at a side of the combustion chamber 6 for heating and feeding the external air to the combustion chamber 6, and a regenerator 8 disposed around the upper portion of the cylinder 1, whereby the regenerator 8 and the power chamber 4 are connected with cooling pipes 9 and a cooling chamber 10 is disposed around the cooling pipes 9 for circulating the cooling water, and the regenerator 8 and the hot space 5 are connected with heating pipes 11. In the drawings, reference numeral 7a represents an inlet for the air pre-heater 7, and reference numerals 10a and 10b represent inlet and outlet of the cooling chamber 10, respectively.

Thus such conventional Stirling engine is provided that when the operating fluid passes from the power chamber 4 through the cooling pipes 9, regenerator 8, and finally the heating pipes 11, the heat of the combustion chamber 6 is received, whereby the pressure is increased. Therefore, this increased pressure is operated to the power piston 2, whereby sometimes, the power piston 2 according to such conventional Stirling engine is made to be dropped down. On the contrary, when the operating fluid passes from the hot space 5 through the heating pipes 11, the regenerator 8, and finally the cooling pipes 9, the operating fluid is cooled and pressure is dropped, whereby the power piston 2 is raised. Therefore, in the Stirling engine, when the operating fluid is heated, the power piston 2 is dropped and when the operating fluid is cooled, the power piston 2 is raised. Thus when such reciprocating movement of the power piston 2 is repeated, the useful power is obtained therefrom.

In such conventional Stirling engine as described above, the cooling system is made such a manner that the cooling chamber 10 is disposed around the cooling pipes 9 and the interior of the cooling chamber 10 is made to flow with cooling water from the inlet 10a to the outlet 10b so that the operating fluid within the cooling pipe 9 is cooled. Therefore, since such conventional cooling system always requires supply of cooling water, it is a number of difficulties in supplying the cooling water in the area of lack in water, thereby having many limitations in using. In addition, the heat to be cooled by the operating fluid is not utilized again for the operation of such conventional Stirling engine and has to be discharged to exterior. Therefore, the heat loss has been much.

For instance of reference, the heat loss according to the cooling water may be counted as an amount of about 30–40% of heat supplied to the engine.

SUMMARY OF THE INVENTION

Accordingly, it is an object of the present invention to provide a cooling system for a Stirling engine in which continuous supply of cooling water is not required and the heat to be cooled by the operating fluid is recovered so that thermal efficiency can be improved.

Another object of the present invention is to provide a cooling system for a Stirling engine including a cooler composed with a thermoelectric heat pump for transferring heat by electric energy to the cooling pipes which are connected from the power chamber to the regenerator, a cooling chamber disposed around the cooler, and an air pre-heater disposed at a side of a combustion chamber.

A further object of the present invention is to provide a cooling system for a Stirling engine which comprises a thermoelectric heat pump having a container configuration for filling cooling water within the interior thereof, and at least one cooling pipe connected to the interior of the thermoelectric heat pump so that the operating fluid flows through at least one cooling pipe. Also the thermoelectric heat pump is structured with an inner side of circumferential surface to be cooled and an outer side to be heated according to direct current applied by electrically connecting with direct current of an electric power source and a number of fins for heat radiation formed on the external peripheral surface of a major wall.

Yet another object of the present invention is to provide a cooling system for a Stirling engine in which when the direct current is applied to a thermoelectric heat pump in a time of operating the Stirling engine, the cooling water contained within the interior thereof is cooled, the operating fluid is cooled by the cooling water while passing through the cooling pipes, and the cooling air is fed and flowed to the cooling chamber around the cooler, whereby upon cooling the cooling chamber, the heated air is fed through the air pre-heater to the combustion chamber so that cooling efficiency of the operating fluid is improved and at the same time combustion efficiency of fuel is improved, and heat efficiency of Stirling engine is improved.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a cooling system for a Stirling engine, a cooler composed of thermoelectric heat pump for transferring heat by electric energy to cooling pipes which are connected from power chamber to regenerator, a cooling chamber disposed around the cooler, and an air pre-heater disposed at a side of combustion chamber, whereby the operating fluid of engine is cooled by utilizing the thermoelectric heat pump so that circulation of continuous cooling water is not required and heat taken out of the operating fluid is made to use for the pre-heating of the air to be fed to the combustion chamber.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
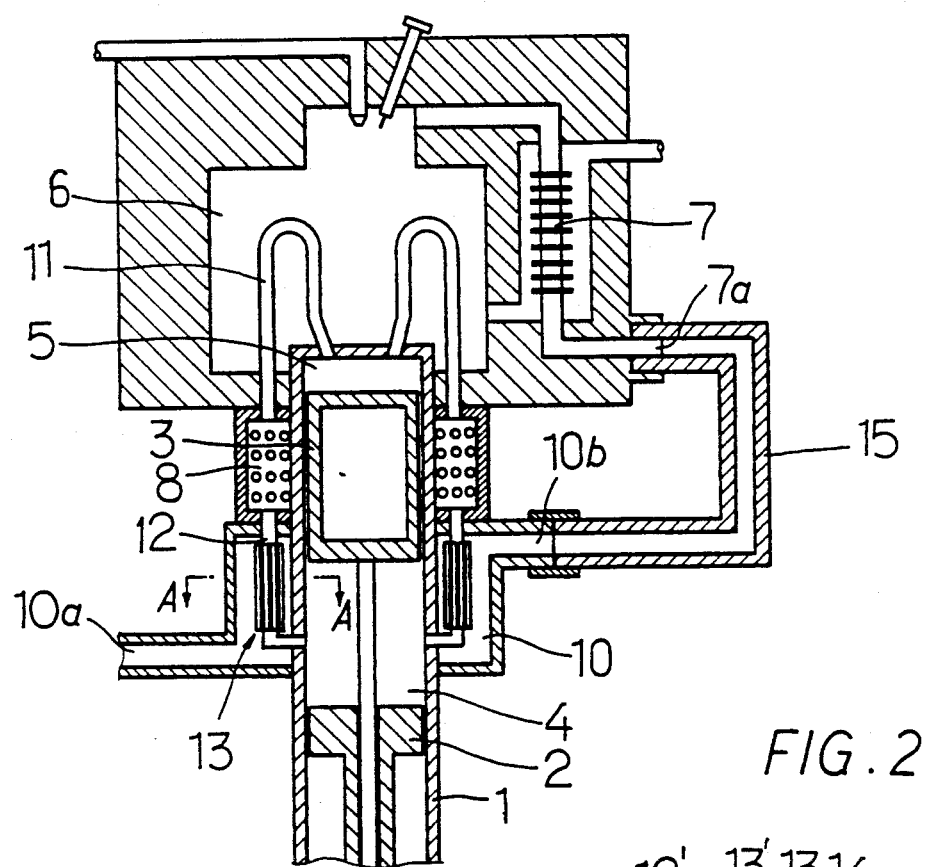
FIG. 1 is a schematic sectional view of the Stirling engine according to the present invention.
Figure 2:
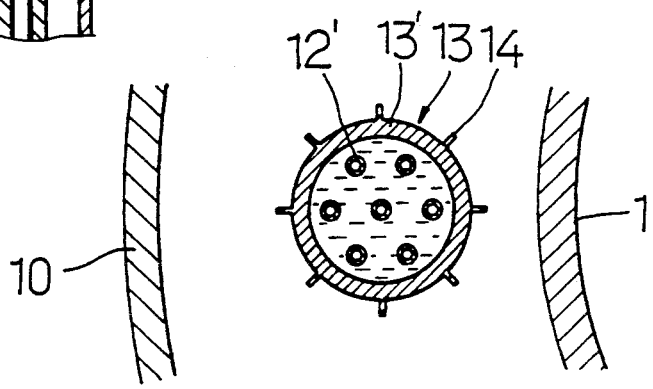
FIG. 2 is a cross-sectional view of FIG. 1, taken along line A—A.
Figure 3:
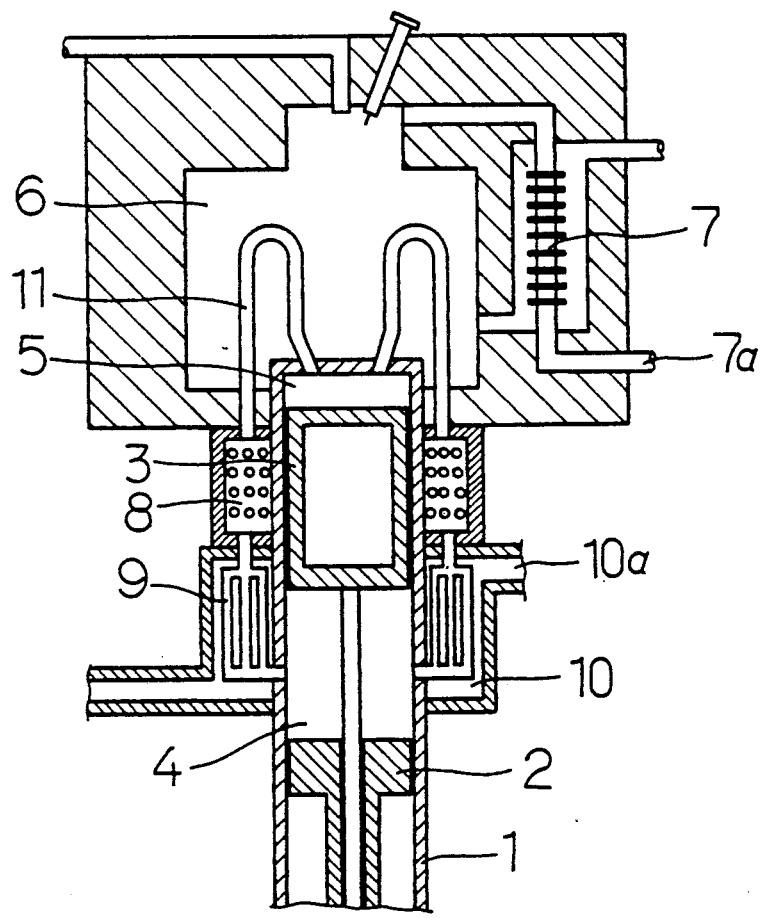
FIG. 3 is a schematic sectional view of a conventional Stirling engine.

Hereinafter, a preferred embodiment of the present invention will be described in detail with reference to the accompanying drawings. As shown in FIGS. 1 and 2, the cooling system for a Stirling engine comprises a cooler 13 including a thermoelectric heat pump 13, connected to a pair of exterior cooling pipes 12 which are connected between a power chamber 4 and a regenerator 8, an inlet 10a and an outlet 10b of a cooling chamber 10 and an inlet 7a of an air pre-heater 7 connected to the outlet 10b.

The thermoelectric heat pump 13' is formed by a piezo element and has a container configuration for containing water within the interior thereof by utilizing a Peltier element or the like which utilizes a Peltier effect. The configuration of the heat pump 13, may be applied to a cylindrical configuration or other shape.

The exterior cooling pipe 12 is connected to the exterior of the thermoelectric heat pump 13'. A plurality of interior cooling pipes 12' are provided at the interior of the thermoelectric heat pump 13' so that the operating fluid flowing through the exterior of the exterior cooling pipe 12 into the interior of cooler 13 passes through the cooling pipes 12' thereby being cooled more efficiently.

However, it is also possible to make the only one exterior cooling pipe 12 is connected to pass through the interior of the thermoelectric heat pump 13' so that the operating fluid passes through the single exterior cooling pipe 12, thereby being cooled.

A plurality of fins 14 are disposed on the external surface of thermoelectric heat pump 13' of the cooler 13 for the heat radiation.

The cooling chamber 10 is utilized as an air cooling chamber for flowing the cooling air from the inlet 10a and thereby cooling the cooler 13 by the cooling air. The connecting pipe 15 is provided for feeding the air heated at the air cooling chamber 10 to the air preheater 7. The connecting pipe 15 is made of insulation material.

The thermoelectric heat pump 13' of the cooler 13 includes an inner side portion to be cooled while an outer side portion to be heated in response to the application of direct current. Therefore, this direct current is made to be possible to obtain by operating a small direct current generator (not shown) according to the output of the Stirling engine. Also, it is also possible to apply a separate direct current power supply source.

The direct current is applied to the thermoelectric heat pump 13' of the cooler 13 in a time of operating the Stirling engine, whereby inner side portion is cooled and accordingly, the cooling water filled within the interior of the thermoelectric heat pump 13' is cooled and while the operating fluid is flowed from one exterior of the cooling pipe 12 into the plurality of cooling pipes 12' and then into the other exterior cooling pipe 12 and thereby being cooled by the cooling water. The heat absorbed to the cooling water is radiated through a plurality of fins 14 disposed on a peripheral wall of the thermoelectric heat pump 13'.

At this moment, while the cooling air is flowed into the cooling chamber 10 and passing therethrough and thereby being primarily heated by the heat radiated from the thermoelectric heat pump 13'. The heated air is flowed into the air pre-heater 7 through the connecting pipe 15. The air is heated by the air pre-heater 7 again and then fed to the combustion chamber 6 thereby being burnt together with fuel fed to the combustion chamber 6.

Also, cooling water is positively cooled by the thermoelectric heat pump 13', whereby the operating fluid is cooled by the cooling water and cooling effect is improved. Since the air is primarily pre-heated by the heat radiation of the thermoelectric heat pump 13' and the second heat of the air pre-heater 7 and then fed to the combustion chamber 6. Therefore, the combustion efficiency is improved.

Particularly, according to the present invention, since the Stirling engine can be operated by only cooling water of predetermined quantity to be filled into the interior of the thermoelectric heat pump 13', it is not necessary to feed the cooling water continuously. It is possible to use without any limitation even in the area where it is hard to obtain the cooling water such as usual water.

Also, the air heated by the heat radiation of the cooler 13 is flowed through the connecting pipe 15 into the air pre-heater 7 in order to increase the thermal efficiency of the Stirling engine and heating again it and then fed to the combustion chamber 6. It is also possible to use the air heated by the radiation of the cooler 13 as a thermal medium of room heating. That is, it may also be used as heat for room heating by directly connecting the outlet 10b of the connecting pipe 15 to a place requiring the room heating.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A cooling system for Stirling engine, which comprises:

a thermoelectric heat pump having a container configuration for filling cooling water therewithin, both ends of said thermoelectric heat pump being connected to a pair of cooling pipes which are connected to a cooling chamber and a regenerator, whereby when direct current is applied, an inner side portion thereof is cooled and an outer side portion thereof is heated.

2. The cooling system of claim 1, wherein the thermoelectric heat pump is cylindrical configuration.

3. The cooling system of claim 2, wherein the thermoelectric heat pump is formed by a piezo element.

4. The cooling system of claim 1, wherein the cooling chamber is disposed around said thermoelectric heat pump and an air pre-heater disposed at the side of a combustion chamber connected to a connecting pipe so that the cooling system prevents heat from losing by heating an air through the radiating heat of the thermoelectric heat pump and flowing the heat air into the cooling chamber, heating again the heat air at the air pre-heater, and feeding the heat air to the combustion chamber.

5. The cooling system of claim 1, wherein said thermoelectric heat pump is provided with at least one heat radiating fin on the external peripheral surface.

6. The cooling system of claim 4, wherein the heat radiating fin is two.

7. The cooling system of claim 5, wherein the heat radiating fin is three.

8. The cooling system of claim 1, wherein the thermoelectric heat pump includes a plurality of interior cooling pipes disposed therewithin.

* * * * *